US006793196B2

United States Patent
VanWeelden et al.

(10) Patent No.: US 6,793,196 B2
(45) Date of Patent: Sep. 21, 2004

(54) HIGH FLOW CONTROL VALVE FOR MOTOR VEHICLE FUEL INJECTION SYSTEMS

(75) Inventors: Curtis L. VanWeelden, Sussex, WI (US); Kathryn I. Bacon, Waukesha, WI (US)

(73) Assignee: Husco International, Inc., Waukesha, WI (US)

( * ) Notice: Subject to any disclaimer, the term of this patent is extended or adjusted under 35 U.S.C. 154(b) by 159 days.

(21) Appl. No.: 10/212,331

(22) Filed: Aug. 5, 2002

(65) Prior Publication Data

US 2004/0021111 A1 Feb. 5, 2004

(51) Int. Cl.[7] ............................................. F16K 31/02
(52) U.S. Cl. ............................ 251/129.07; 251/129.16; 251/282
(58) Field of Search ..................... 251/129.02, 129.07, 251/129.15, 129.16, 282; 239/453, 533.7, 585.3, DIG. 4

(56) References Cited

U.S. PATENT DOCUMENTS

| | | | |
|---|---|---|---|
| 3,735,371 A | * 5/1973 | Lerner et al. | ........... 340/870.04 |
| 4,643,223 A | 2/1987 | Abe et al. | |
| 4,779,838 A | 10/1988 | Greiner et al. | |
| 5,156,341 A | 10/1992 | Terakado et al. | |
| 5,240,227 A | 8/1993 | Sich | |
| 5,251,659 A | * 10/1993 | Sturman et al. | ............. 137/339 |
| 5,413,308 A | * 5/1995 | Hayes | .......................... 251/77 |
| 5,547,165 A | 8/1996 | Brehm et al. | |
| 5,582,153 A | 12/1996 | Dutt et al. | |
| 5,901,941 A | 5/1999 | Ricco | |
| 5,915,669 A | 6/1999 | Zabeck et al. | |
| 5,950,932 A | 9/1999 | Takeda et al. | |
| 5,982,073 A | 11/1999 | Lashmore et al. | |
| 6,129,790 A | 10/2000 | Lashmore et al. | |
| 6,152,387 A | 11/2000 | Ricco | |
| 6,244,526 B1 | 6/2001 | Schuldt et al. | |
| 6,251,514 B1 | 6/2001 | Lashmore et al. | |

* cited by examiner

Primary Examiner—Edward K. Look
Assistant Examiner—John K. Fristoe, Jr.
(74) Attorney, Agent, or Firm—George E. Haas; Quarles & Brady LLP

(57) ABSTRACT

A flow control valve is intended for use in a gasoline direct injection system of an engine to maintain the fuel rail pressure at a consistent level as the cylinder injector valves open and close. A valve element moves against and away from a seat to control the flow of fuel through the valve. The high pressure from the fuel supply rail acts on surfaces of the valve which are designed to produce a force imbalance that serves to rapidly open the valve element. The electromagnetic actuator has components fabricated from a soft magnetic composite material which reduce eddy currents that could impede performance of the valve. The electromagnetic actuator is sealed so that that the fuel does not impede movement of the components. A low impedance coil also is used to operate the valve.

14 Claims, 2 Drawing Sheets

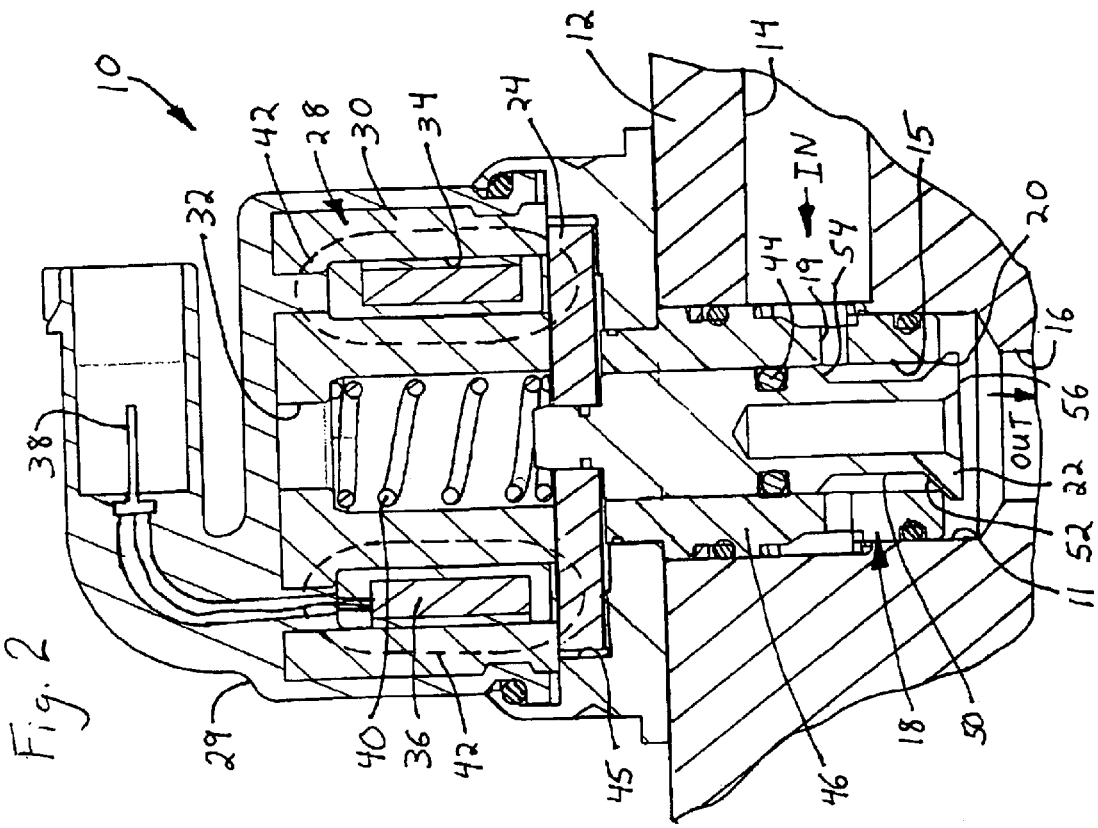
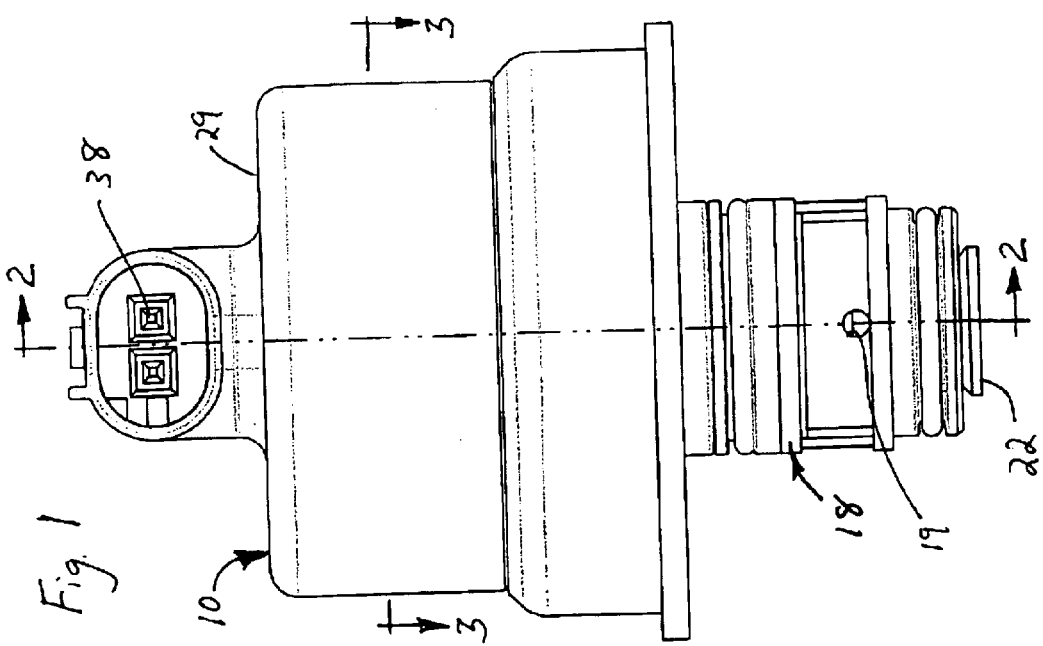

HIGH FLOW CONTROL VALVE FOR MOTOR VEHICLE FUEL INJECTION SYSTEMS

BACKGROUND OF THE INVENTION

1. Field of the Invention

The present invention relates to fuel systems for internal combustion engines, and particularly to valves for controlling pressure of fuel delivered to injector valves in the engine.

2. Description of the Related Art

For many decades gasoline internal combustion engines used a carburetor to mix fuel with incoming air. The resulting air/fuel mixture was distributed through an intake manifold and mechanical intake valves to each of the engine cylinders. Multi-port fuel injection systems have replaced the carburetion systems for most engines. A multi-port fuel injection system has a separate fuel injector valve which injects gasoline under pressure into the intake port at each cylinder where the gasoline mixes with air flowing into the cylinder. Even with multi-port fuel injection, there are limits to the fuel supply response and combustion control which can be achieved.

More recently a third approach to supplying fuel into the engine cylinders has been devised. Known as "gasoline direct injection" or "GDI", this techniques injects the fuel directly into the combustion cylinder through a port that is separate from the air inlet passage. Thus the fuel does not premix with the incoming air, thereby allowing more precise control of the amount of fuel supplied to the cylinder and the point during the piston stroke at which the fuel is injected. Specifically, when the engine operates at higher speeds or higher loads, fuel injection occurs during the intake stroke which optimizes combustion under those conditions. During normal driving conditions, fuel injection happens at a latter stage of the compression stroke and provides an ultra-lean air to fuel ratio for relatively low fuel consumption. Because the fuel may be injected while high compression pressure exists in the cylinder, gasoline direct injection requires that the fuel be supplied to the injector valve at a relatively high pressure, for example 100 times that used in multi-port injection systems.

There are periods when all of the injector valves are closed and thus the gasoline in the conduit, known as the fuel supply rail, between the outlet passage of the fuel pump and cylinders has no place to go. This has not presented a significant problem in prior fuel systems that operated at lower pressure. However, at the significantly greater pressure of the gasoline direct injection system, the fuel system components down stream of the fuel pump must be capable of withstanding that pressure. In addition, a very high back pressure load occurs at the fuel pump at those times.

Therefore it is desirable to provide a mechanism for maintaining a consistent pressure level in the section of the fuel system that is downstream of the fuel pump outlet passage even as the injector valves open and close.

SUMMARY OF THE INVENTION

The present electrohydraulic flow control valve is intended to be connected to the high pressure side of a pump from which fuel is furnished to the injectors for the engine cylinders. This flow control valve provides a path through which high pressure fuel travels back to the low pressure line from the fuel tank thereby maintaining consistent pressure in the fuel supply rail. The flow control valve is designed for high speed operation. This is accomplished by an electromagnetic actuator that has components fabricated from a soft magnetic composite material. This composite material provides a non-electrically conductive path for the magnetic flux which reduces the eddy currents that otherwise would slow build-up of the magnetic flux and thus the speed of the actuator. Another factor enhancing performance of the flow control valve is that the armature of the electromagnetic actuator does not come into contact with the fuel flowing through the valve. Thus the armature motion encounters a lower fluidic resistance of air, as compared to liquid fuel.

The flow control valve includes a valve stem with a bore having a valve seat at one end. An inlet port in the valve stem provides an fluid path between the fuel rail and the bore. A valve element is located within the bore and selectively engages the valve seat to control flow of fluid between the inlet passage and outlet passages. The valve element has an exterior groove in communication with the inlet port. The exterior groove has first surface proximate to the valve seat and a second surface remote from the valve seat. Because the first surface is larger than the second surface, pressure in the groove tends to bias the valve element away from the valve seat, that is into an open position.

The electromagnetic actuator is operatively coupled to move the valve element with respect to the valve seat.

BRIEF DESCRIPTION OF THE DRAWINGS

FIG. 1 is a side view of a valve according to the present invention;

FIG. 2 is a cross sectional view along line 2—2 in FIG. 1;

DETAILED DESCRIPTION OF THE INVENTION

Figure 3:
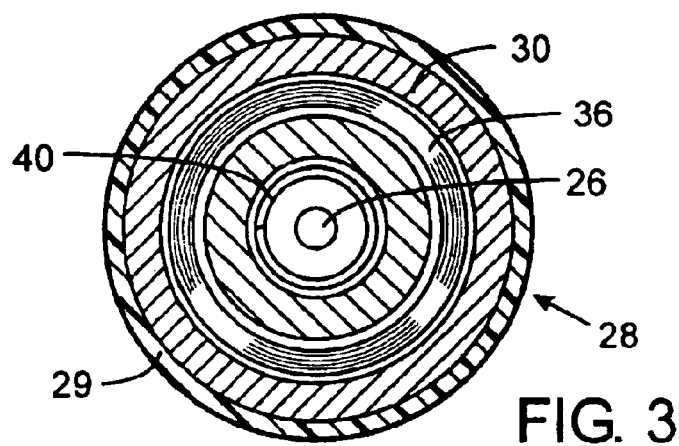
FIG. 3 is a cross sectional view along line 3—3 in FIG. 1.

With reference to the FIGS. 1 and 2, an electrohydraulic flow control valve 10 mounts within an aperture 11 in the body 12 of the fuel pump of an internal combustion engine. An inlet passage 14 extends in the body 12 from the aperture 11 to the high pressure fuel supply rail which receives the output of the fuel pump. An outlet passage 16 provides a fluid path between the aperture and a lower pressure point of the engine fuel system, such as the inlet of the fuel pump.

The flow control valve 10 has a tubular stem 18 which extends into the fuel pump aperture 11 and interfaces with both the inlet passage 14 and outlet passage 16 to control the fluid flow there between. Specifically, the valve stem 18 has a longitudinal bore 15 extending there through with a transverse inlet port 19 coupling the inlet passage 14 to the aperture. A valve seat 20 is formed at an end opening of the bore 15 which communicates with the outlet passage 16. A valve element 22 is slidably received in the bore 15 of the valve stem 18 and has an interior end with a tapered section that abuts the valve seat 20 in the closed state of the flow control valve.

The other end of valve element 22 is mechanically joined, such as by brazing or welding for example, into a central aperture in an armature disk 24. On the opposite side of the armature disk 24 is a solenoid actuator 28, which has an outer housing 29 that encloses a magnetically conductive pole piece 30 with a central aperture 32 and an annular groove 34 extending around the central aperture (see FIG.

3). An electromagnetic coil 36 is wound within the annular groove 34 and has leads which extend to a connector 38 for connection to the controller that governs engine operation. The electromagnetic coil 36 has an inductance that is less than 3.0 mH and a resistance that is less than 1 Ohm. Preferably the inductance of the electromagnetic coil 36 is 2.5 mH and the resistance is 0.2 Ohm. A spring 40 within the central aperture 32 of the pole piece biases the armature disk 24 so as to push the valve element 22 away from the valve seat 20 and open the valve.

Energizing electromagnetic coil 36 produces a magnetic field indicated by flux lines 42 which attracts the armature disk 24 toward the pole piece 30 to pull the valve element 22 against the valve seat 20 closing the valve, as illustrated in FIG. 2. The magnetic flux flows through the armature disk 24 and pole piece 30, The size of the electromagnet coil required to generate the necessary force is reduced by providing large cross section areas and very small air gaps through which the flux 42 flows.

The pole piece 30 is made of "soft composite material" which is a powder comprising a plurality of ferromagnetic particles with an electrical insulating coating. The coating imparts electrical insulation adjacent the ferromagnetic particles of at least one milliohm-cm. The valve component 30 is fabricated by compacting the ferromagnetic powder. Soft magnetic composite materials and processes for fabricating electromagnet cores from them are described in U.S. Pat. No. 6,251,514 because the individual particles ferromagnetic powder are electrically insulated from one another, the pole piece 30 provides a non-electrically conductive path for the magnetic flux which reduces the eddy currents that otherwise would slow reversal of the flux. Reduction of eddy currents enables the electromagnet actuator of the valve to have a fast response time as compared to actuators with conventional electromagnet pole pieces.

The speed of the valve's operation is further enhanced because the armature disk 24 does not come into contact with the liquid fuel flowing through the flow control valve 10. A seal 44 prevents the fuel from traveling between the valve element 22 and the outer section 46 of the valve stem 18. This seal 44 prevents the fuel from reaching the armature disk 24. The isolation of the armature disk 24 from the fluid being controlled is a significant feature of the present flow control valve 10. If fluid was allowed into the chamber 45 in which the armature disk 24 is located, that fluid would provide resistance to rapid movement of the disk as the valve opens and closes. That is, fluid accumulated on one side of the disk would have to flow to the opposite side in order to allow the disk to move within the chamber 45. Thus, this feature is important to enabling the rapid operation of the valve which is required in the present fuel system.

Figure 4:
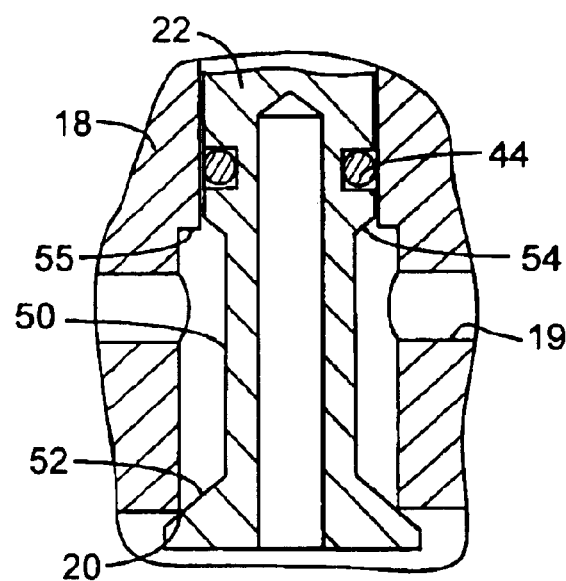
FIG. 4 is an enlargement of the valve area in FIG. 2.

With reference to FIGS. 2 and 4, the forces due to the fluid pressures acting on the valve element 22 are substantially imbalanced to provide a fast open time. Specifically, the valve element has an outer circumferential groove 50 with a first end surfaces 52 proximate the valve seat 20 and a second end surface 54 remote from the valve seat, with both end surfaces being exposed to the high pressure fluid in the inlet passage 14 from the fuel supply rail. The diameter of the valve stem bore 15 in the vicinity of the circumferential groove 50 is slightly larger that the diameter of the bore closer to the armature 24, thereby creating a lip 55 adjacent the first end surface 52 (FIG. 4). As a result, the area of the second end surface 54 is substantially smaller than the area of the first end surface 52 which is exposed to the high pressure fluid when the valve is closed.

Because of this surface area differential, the force produced by the high pressure fluid acting on those end surfaces 52 and 54 is greater in a direction which tends to move the valve element 22 away from the valve seat 20, i.e. open the valve. As a consequence, a relatively small force from the spring 40 is able to overcome force exerted on the nose 56 of the valve element 22 by the relatively low pressure in the outlet passage 16 and thus open the flow control valve 10. However, the magnetic force from the electromagnetic coil 36, required to close the flow control valve 10, must be great enough to overcome the inlet passage pressure and the spring force.

The present valve 10 has particular use in regulating the pressure in the fuel rail of a fuel injection system of an internal combustion engine. In that application, the valve is opened an closed very rapidly many times during each cycle of the engine to relieve pressure in the fuel rail. The flow control valve 10 has several features that contributes to the ability to operate at such high speeds. The size differential of the end surfaces of the groove 50 in the valve element, and the relatively low inductance and resistance of the solenoid actuator are two of these features. Other features include the use of soft magnetic composite material for the pole piece of the solenoid which reduces eddy currents. Another factor enhancing performance of the flow control valve is that the armature of the actuator does not come into contact with the fuel flowing through the valve and thus its motion encounters a lower fluidic resistance of air as compared to liquid fuel.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

We claim:

1. A control valve for a motor vehicle fuel injection system, which has a body with an aperture having a first end and a second end, an outlet passage communicating with the first end of the aperture, and an inlet passage communicating with the aperture between the first end and a second end; said control valve comprising:

a valve stem for insertion into the aperture and having a bore with a valve seat at one end and an inlet port to provide an fluid path between the inlet passage and the bore;

a valve element within the bore of the valve stem and selectively engaging the valve seat to control flow of liquid between the inlet passage and the outlet passage;

a solenoid actuator having an electromagnetic coil and an armature which is driven by an electromagnetic field produced by the electromagnetic coil, wherein the armature is operatively coupled to move the valve element toward the valve seat in response to the electromagnetic field, and the electromagnetic coil has an inductance that is less than 3.0 mH and a resistance that is less than 1.0 Ohm; and a seal between the valve stem and the valve element to prevent the liquid in the bore from flowing to the solenoid actuator so that the armature remains dry and thus the liquid does not affect movement of the armature.

2. The control valve as recited in claim 1 further comprising a pole piece fabricated from a soft magnetic composite material and about which the electromagnetic coil is wound.

3. The control valve as recited in claim 2 wherein the armature is a magnetically conductive disk adjacent to the pole piece.

4. The control valve as recited in claim 1 wherein the inductance of the electromagnetic coil is 2.5 mH and the resistance is 0.2 Ohm.

5. The control valve as recited in claim 1 wherein the valve element has an exterior groove in communication with the inlet port, the exterior groove having first surface proximate to the valve seat and a second surface remote from the valve seat, wherein the first surface is larger than the second surface so that pressure in the groove tends to move the valve element away from the valve seat.

6. A control valve for a motor vehicle fuel injection system, which has a body with an aperture having a first end and a second end, an outlet passage communicating with the first end of the aperture, and an inlet passage communicating with the aperture between the first end and a second end; said control valve comprising:

a valve stem for insertion into the aperture and having a bore with a valve seat at one end and an inlet port to provide an fluid path between the inlet passage and the bore;

a valve element within the bore and selectively engaging the valve seat to control flow of fluid between the inlet passage and the outlet passage, wherein the valve element has an exterior groove in communication with the inlet port, the exterior groove having first surface proximate to the valve seat and a second surface remote from the valve seat, wherein the first surface is larger than the second surface so that pressure in the groove tends to move the valve element away from the valve seat; and a solenoid actuator operatively coupled to move the valve element toward the valve seat and having an electromagnetic coil with an inductance that is less than 3.0 mH and a resistance that is less than 1.0 Ohm.

7. The control valve as recited in claim 6 wherein the inductance of the electromagnetic coil is 2.5 mH and the resistance is 0.2 Ohm.

8. The control valve as recited in claim 6 further comprising a pole piece of a soft composite magnetic material adjacent the electromagnetic coil.

9. The control valve as recited in claim 6 further comprising a pole piece of a soft composite magnetic material with an annular groove within which the electromagnetic coil is received.

10. The control valve as recited in claim 6 wherein the solenoid actuator further comprises an armature disk connected to the valve element and moving in response to an electromagnetic field produced by the electromagnetic coil.

11. The control valve as recited in claim 6 further comprising a seal preventing fluid in the bore from flowing to the solenoid actuator so that the armature remains dry and this the fluid does not impede movement of the armature.

12. A control valve for a motor vehicle fuel injection system, which has a body with an aperture having a first end and a second end, an outlet passage communicating with the first end of the bore, and an inlet passage communicating with the aperture between the first end and a second end; said control valve comprising:

a valve stem for insertion into the bore and having a bore with a valve seat at one end and an inlet port to provide an fluid path between the inlet passage and the bore;

a valve element within the bore and selectively engaging the valve seat to control flow of fluid between the inlet passage and the outlet passage, wherein the valve element has an exterior groove in communication with the inlet port, the exterior groove having first surface proximate to the valve seat and a second surface remote from the valve seat, wherein the first surface is larger than the second surface so that pressure in the groove tends to bias the valve element away from the valve seat;

a seal between the valve stem and the valve element to prevent the liquid in the bore from flowing to the solenoid actuator so that the armature remains dry and thus the liquid does not affect movement of the armature; and a solenoid actuator operatively coupled to move the valve element toward the valve seat and having an electromagnetic coil with an inductance that is less than 3.0 mH and a resistance that is less than 1.0 Ohm, the solenoid actuator including a pole piece of a soft composite magnetic material adjacent the electromagnetic coil.

13. The control valve as recited in claim 12 wherein the pole piece has an annular groove within which the electromagnetic coil is received.

14. The control valve as recited in claim 12 wherein the inductance of the electromagnetic coil is 2.5 mH and the resistance is 0.2 Ohm.

* * * * *